July 28, 1925.
M. K. AKERS
1,547,635
GAS ENGINE IGNITION COIL
Filed May 2, 1921
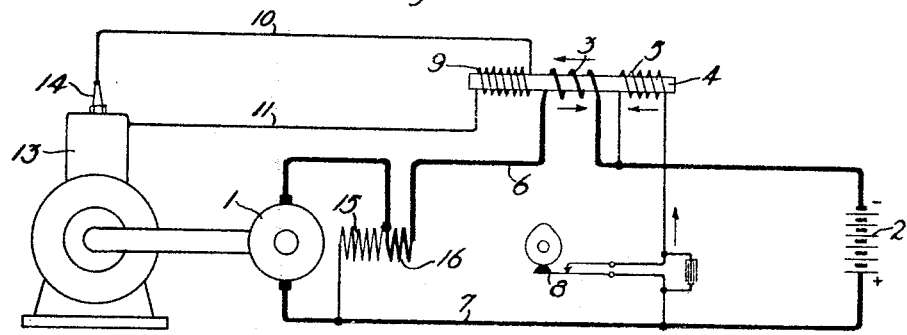
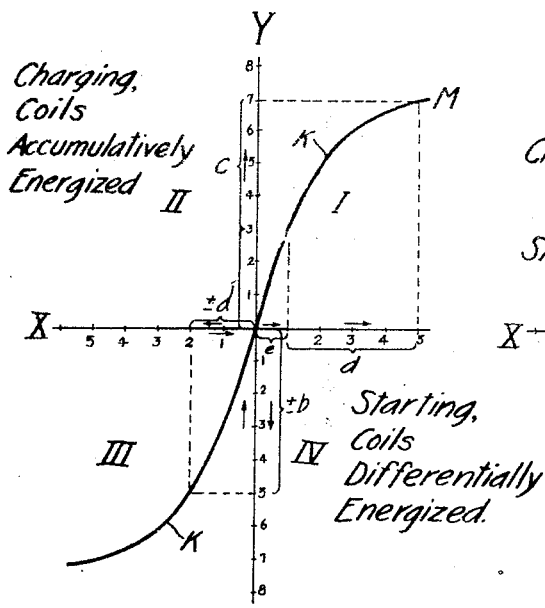
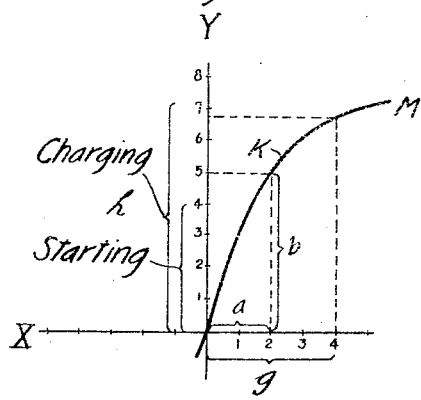
Inventor:
Milton K. Akers
by
Atty Patented July 28, 1925.

1,547,635

UNITED STATES PATENT OFFICE.

MILTON K. AKERS, OF EAST ORANGE, NEW JERSEY, ASSIGNOR TO WESTERN ELECTRIC COMPANY, INCORPORATED, OF NEW YORK, N. Y., A CORPORATION OF NEW YORK.

GAS-ENGINE IGNITION COIL.

Application filed May 2, 1921. Serial No. 465,992.

*To all whom it may concern:*

Be it known that I, MILTON K. AKERS, a citizen of the United States, residing at East Orange, in the county of Essex and State of New Jersey, have invented certain new and useful Improvements in Gas-Engine Ignition Coils, of which the following is a full, clear, concise, and exact description.

This invention relates to new and useful improvements in induction coils and more particularly to such coils used in gas engine ignition systems.

It has been found practically impossible heretofore to design an induction coil which would satisfactorily operate for the different amounts of magnetomotive force available at various stages in the operation of prime mover dynamo plants in which a battery is employed to start the system and is then charged by the system; for, if a coil was used which proved effective for starting purposes with the battery voltage low, that same coil would cause pre-ignition when the system was in full operation with the battery voltage high, the dynamo operating to charge the battery, or, if a coil worked well with the system in full operation, it would fail completely when fewer ampere turns were available, as at starting. It is the object of the invention to produce an induction coil which overcomes the above noted defects and meets all the requirements necessary in induction coils for prime mover dynamo plants.

A further object of the invention is to so control the range of variation of the magnetic flux resulting in the core of an induction coil upon the making and breaking of its primary winding that the voltage induced into the secondary winding, is relatively larger, when the total magnetomotive force in the primary windings has a low value, than the voltage induced into the said secondary winding when the total magnetomotive force has a greater value.

The invention is, for example, adapted for use in systems in which a prime mover, motor-dynamo, plant is electrically connected for reciprocal operation; the prime mover actuating the motor dynamo to charge an electric accumulator on the one hand and the accumulator serving to energize the motor dynamo to start the prime mover on the other hand. In such systems, it is desirable when the prime mover is being actuated by the motor for starting, that the ignition device should be supplied with a heavy, or what is termed, a "fat" spark even though the magnetomotive force due to the primary coils of the induction coil is small. It is also desirable when the motor dynamo, actuated by the prime mover, is furnishing charging current to the accumulator, to have a spark no more intense than the spark secured in the first instance so as to avoid a greater induced secondary voltage at the make of the primary contacts and therefore prevent electrical preignition. The present invention accomplishes the above noted desirable results by obtaining in the core of the induction coil a relatively large flux variation with a magnetomotive force of low value and a slightly diminished range of flux variation with magnetomotive force of higher value.

More specifically, the invention concerns an induction or an ignition coil which has two primary windings and one secondary winding, the two primary windings being so arranged in circuits that they are differentially energized when the battery is supplying current to the dynamo to start the prime mover and cumulatively energized when the dynamo actuated by the prime mover is in full operation, and is generating current to charge the battery. One of the two windings is in series in the dynamo-battery circuit and is so placed that the current flowing through it will be continuous whereas the other winding is in shunt with the battery and has in its circuit a current interrupter whereby it may be intermittently energized.

In the accompanying drawings:—

Fig. 1 is a diagrammatic view of a prime mover, motor-generator system including a preferred embodiment of the improved ignition coil.

Fig. 2 is a magnetic saturation curve for soft iron of which the core of the improved induction coil is composed, the flux conditions in the said coil being graphically represented.

Fig. 3 is a curve similar to Fig. 2 upon which the electromagnetic conditions in an ordinary induction coil are graphically represented.

Referring to the drawings in detail, in Fig. 1, a motor dynamo 1 having a shunt winding 15 and a series winding 16, is connected in circuit with an electric accumulator 2, the motor dynamo being mechanically connected to an internal combustion engine 13. In series with this circuit is a primary winding 3 of the ignition coil 4, a second primary winding 5 being bridged across the two main leads 6 and 7 of the circuit. A current interrupter or timer 8 driven by the engine 13 serves to periodically interrupt the current passing through the winding 5 so that a voltage is induced in a secondary winding 9 which has one of its leads 10 connected to the spark plug 14 of the engine and its other lead 11 grounded on the engine cylinder.

Since the primary winding 5 is in shunt with the motor dynamo and accumulator 2, it will always be energized in the same direction regardless of whether the system is being energized by the accumulator or the motor dynamo. The series winding, on the other hand, will be energized in opposite directions by each of the two sources.

In Fig. 2 is shown graphically the manner in which a piece of metal, such as soft iron, responds when magnetized by an electric current. This is the well known magnetization or magnetic saturation curve which has been given in simple form, the ordinary hysteresis losses being omitted for the sake of clarity. The X axis represents the magnetomotive force or ampere turns to which the metal is subjected whereas the Y axis indicates the magnetism or the magnetic flux resulting from said magnetomotive force.

It is important to remember that in any system of induction the secondary or induced voltage obtained is not due directly to magnetic flux in the system but to the magnetic flux variation. Therefore, in comparing the flux variations obtained under conditions of battery charging and battery discharging in the core of the improved induction coil with those obtained in an ordinary induction coil under the same conditions, the manner in which the series coil 3 serves to prevent preignition will be more readily understood.

For purposes of illustration, the starting current in the circuit and, consequently, in series coil 3, is assumed to be double the normal charging current, a higher amperage being necessary for starting than for charging. The external E. M. F. of the battery, on the other hand, is, say, one-half normal. The magnetomotive force in the core of the coil under starting conditions is graphically illustrated in quadrant III of Figure 2. Here the constant magnetomotive force or number of ampere turns in series coil 3 is represented by $-a$, (the negative value here merely indicates reversed polarity) and the magnetic flux resulting in the core of the coil 4 by $-b$. The intermittent magnetomotive force in differential winding 5, on the other hand is represented by $+a$ and the flux resulting therefrom by $+b$ or a flux variation of five units. The two flux values ($-b$ and $+b$) are superimposed upon each other in quadrant III but it can be plainly seen that they neutralize one another only when both are effective, so that the resulting flux will be between the values zero and $-b$, the zero value being obtained (disregarding slight discrepancies due to magnetic lag) when the shunt winding is energized, and the $-b$ value when the circuit of the shunt winding is broken. If there were no series coil present in the system there would still be a magnetomotive force of $+a$ and a flux of $+b$ (Fig. 3) giving a resulting flux variation from zero to $+b$, opposite in polarity but numerically equal to the flux variation in the above instance and therefore similar in its secondary effects under starting conditions to the improved coil. The improved coil therefore operates at starting when its windings are differentially energized similar to any coil especially designed for starting purposes.

In charging, on the other hand, the following conditions prevail under which a novel result is obtained. The current through the main circuit will be normal, and, in accordance with the above assumption that the starting current has double the value of the charging current, it will have a value equal to one-half of the value that it had in starting. The ampere turns or magnetomotive force in winding 3 will therefore also have one-half of the value at starting, this value being represented in quadrant I of Figure 2 by $+e$ ($e=1/2a$). As winding 3 is now energized in a direction opposite to the direction in which it was energized during starting, the current flowing through shunt winding 5, which had one-half normal voltage at starting, will double its value under the influence of normal voltage so that the ampere turns or magnetomotive force in winding 5 may be represented by $d$ ($d=2a$). The flux produced in the core of the coil 4 by the two forces $e$ and $d$ may be represented by $f$ and $c$ respectively, $f$ being a constant value due to series winding 3 and $c$ a variable value which is added to and taken away from the total flux in the core of the coil periodically as the shunt winding 5 is energized and deenergized. The flux variation in this instance will therefore be equal to $c$, or a flux variation of four units as compared to five units in starting.

The flux variation in an induction coil not having the series winding but operating in all other respects under conditions peculiar to battery charging, is derived from Figure 3 in which a magnetomotive force $g$ which is equal to $d$ is seen to produce a flux variation of between six and seven units as compared to five units in starting. Since the induced secondary voltage is proportionate to the flux variation, it is evident that in the latter case the secondary voltage would be considerably greater and hence might cause electrical preignition during running.

What is claimed is:

1. An induction coil, a primary and a secondary winding for said coil and means responsive to the direction of its energizing current for controlling the magnitude of the magnetic flux variation in said coil.

2. In an electric system, a secondary battery, a prime mover, a dynamo electric machine driven as a generator by said prime mover to charge the battery, and serving as a motor when energized by the battery to start the prime mover; an ignition circuit for said prime mover comprising a secondary coil, a primary coil in shunt of said dynamo battery circuit, and a third coil disposed in series relation to said dynamo battery circuit whereby the inductive relationship of said primary and secondary coils is controlled.

3. In an ignition system, an induction coil and two sources of current arranged to alternately energize said coil, means whereby, when the coil is being energized by one source, the magnetic flux in the core of said coil will be kept within that range of magnetic densities in which its permeability is a maximum, and whereby, when said coil is energized by said second source, the magnetic flux in its core will be maintained within a smaller range of magnetic densities.

4. In an induction coil a primary and a secondary winding, and means comprising a third winding and responsive to the direction of the current energizing said third winding for controlling the magnitude of the magnetic flux variation in said coil.

5. In an ignition apparatus for internal combustion engines in combination, a secondary circuit, a primary coil inductively related to said circuit, a source of current connected with said coil, a second primary coil inductively related to said secondary circuit and connected to said source of current, a second source of current alternating with said first source to energize said primary coils, means serving to interrupt periodically the current flowing into the first of said coils, and means for reversing the current flowing through the second of said primary coils when said coils are alternately connected to one or the other of said sources of current.

6. A source of electrical energy and a circuit therefor, a second source of electrical energy for said circuit, both of said sources being adapted to function alternately as translating devices; an induction coil in said circuit, a secondary winding for said induction coil, two primary windings in the circuit energized alternately by said sources, means in said circuit whereby the current in one of said primary windings may be periodically interrupted, and means comprising a series circuit whereby the second of said windings may be either differentially or cumulatively energized with respect to the first winding according as one or the other of said sources is energizing said circuit.

7. An electrical circuit comprising two devices which are adapted to function alternately as sources and translating devices, the one functioning as a source when the other functions as a translating device; an internal combustion engine serving to actuate one of said devices whereby it functions as a source and to be actuated by said device, while functioning in its translative capacity, a circuit including said devices, an induction coil in said circuit whereby an effective spark is obtained in the combustion engine when either of said devices functions as a source, comprising a secondary winding, a periodically energized primary winding, and a third winding so arranged as to be cumulatively energized with said primary winding when one of said devices functions as a source, and differentially energized from said primary winding when the other of said devices functions as a source.

8. A storage battery charging system comprising an electric accumulator, a dynamo electric machine for charging said accumulator, a prime mover serving to actuate said dynamo electric machine, an ignition system for said prime mover arranged for alternate energization by said electric accumulator and said dynamo electric machine; an ignition coil in said system comprising a plurality of primary windings, said primary windings being differentially energized when said system is energized by one source and cumulatively energized when energized by the other source.

9. In a battery charging system, a battery, a dynamo electric machine, a prime mover for actuating said dynamo electric machine, a circuit including said elements whereby the battery may be charged by, or serve to energize said dynamo electric machine, a secondary circuit inductively related to the first or primary circuit, and means whereby two different inductive relations may be made to obtain between said circuits when the primary circuit is energized by the battery or the dynamo electric machine as a source.

10. In an electric starting and ignition system for an internal combustion engine, a motor for starting said engine, a battery, circuit connections therebetween, an induction coil and means positioned in said circuit connections effective to diminish the normal flux value within the induction coil during the operation of the motor.

11. In an electric starting and ignition system for an internal combustion engine, a starting motor for said engine, a battery, circuit connections between said motor and battery, an induction coil having a primary and a secondary winding and a winding connected in circuit with said motor and arranged adjacent said coil such that its flux tends to interlink said secondary winding oppositely to that of the primary winding.

12. In an electric starting and ignition system for an internal combustion engine, a starting motor for said engine, a battery, circuit connections between said motor and said battery, an induction coil comprising a core having a primary winding connected to said battery and a secondary winding and an auxiliary winding on said core, connected in series with said motor to oppose the flux of said primary winding.

13. In an electric starting and ignition system for an internal combustion engine, a dynamo electric machine for starting said engine, a source of energy, circuit connections between said source and said machine, ignition apparatus for said engine, and means positioned in said circuit connections electromagnetically related to said ignition apparatus and having a polarity opposite thereto.

In witness whereof, I hereunto subscribe my name this 20th day of April A. D. 1921.

MILTON K. AKERS.